United States Patent Office 3,687,828
Patented Aug. 29, 1972

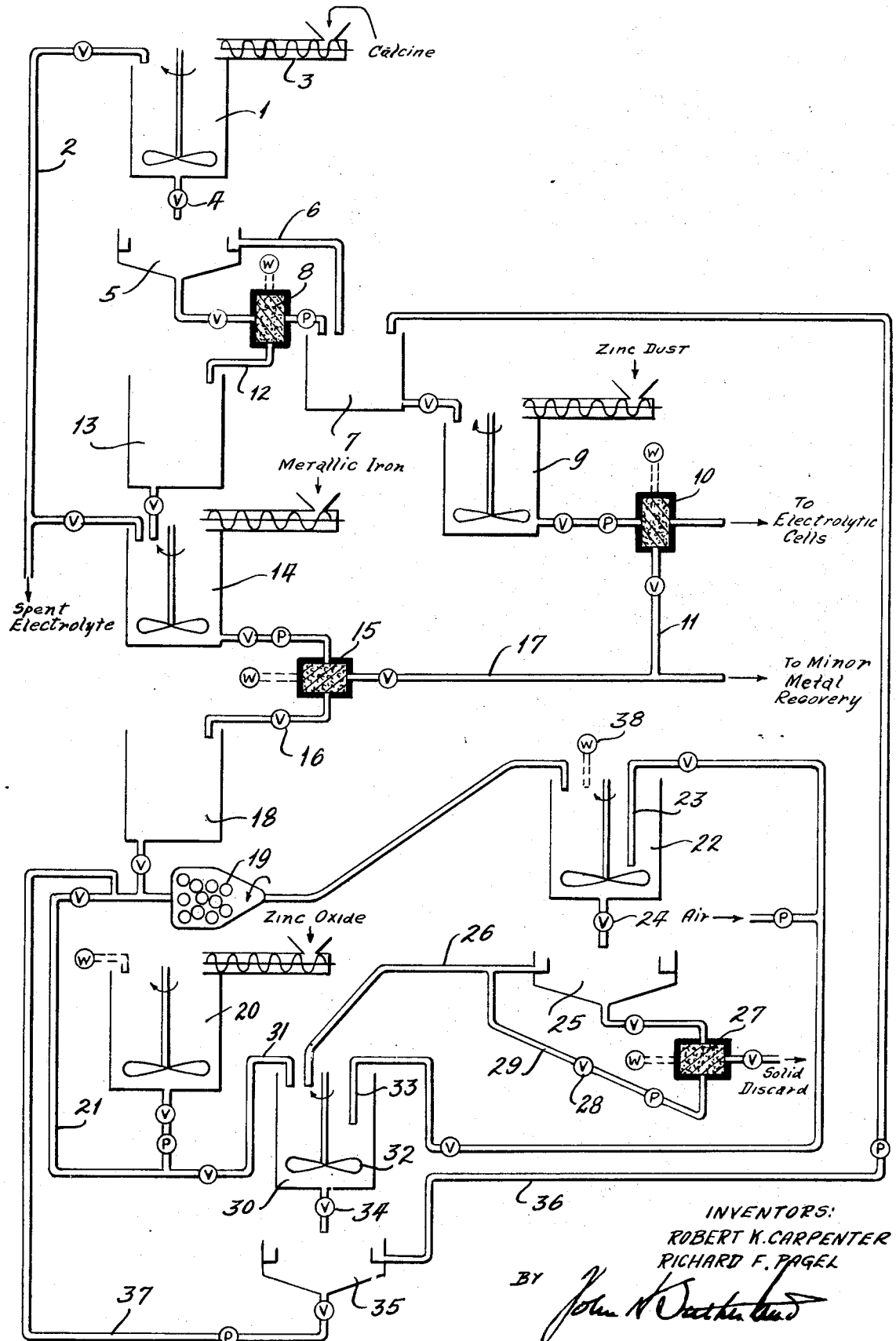

3,687,828
RECOVERY OF METAL VALUES
Robert K. Carpenter, Arnold, Mo., and Richard F. Pagel, Belleville, Ill., assignors to American Zinc Co., St. Louis, Mo.
Continuation-in-part of application Ser. No. 629,580, Apr. 10, 1967, which is a continuation-in-part of application Ser. No. 267,807, Mar. 25, 1963. This application June 25, 1970, Ser. No. 49,713
Int. Cl. C22b 3/00, 19/00; C22d 1/22
U.S. Cl. 204—119                    16 Claims

ABSTRACT OF THE DISCLOSURE

Preparation of zinc electrolyte from zinciferous ore in which the ferritic residue from the usual leach is releached in the presence of a reducing agent such as metallic iron, to produce a filtrate having an iron content of 20–60 grams per liter, and wherein the last-mentioned filtrate is, in successive stages, neutralized and oxidized concomitantly with precipitation of the iron therefrom, first while the pH value is maintained below 4.0 and preferably in the range of 1.5 to 3.6 until the major portion of the iron has been precipitated in a form readily separable from the liquid phase, and second while the pH value of said iron-depleted solution is maintained at a pH value of 4 to 4.5.

CROSS-REFERENCE TO RELATED APPLICATION

This application is a continuation-in-part of our prior copending application Ser. No. 629,580, filed Apr. 10, 1967, now abandoned which was a continuation-in-part of Ser. No. 267,807, filed Mar. 25, 1963, now abandoned.

The present invention pertains generally to the recovery of zinc, and particularly to the recovery of zinc from a zinc-iron solution derived from the releaching of residues left after initial leaching of zinciferous material wherein a substantial part of the values are in the ferritic form.

In the usual commercial process of electrowinning zinc, zinc oride is dissolved in sulfuric acid. The resultant zinc sulfate solution after purification is brought into an electrolytic cell, where zinc is deposited at the cathode as metallic zinc, oxygen is liberated, and the sulfuric acid is recovered. The recovered sulfuric acid is known to the industry as "spent electrolyte," which assays in the neighborhood of about 185 grams per liter sulfuric acid, and is used to dissolve more zinc oxide when the cycle is repeated.

Zinc oxide used in the process is obtained by roasting the zinc ore concentrate, generally a zinc sulfide. The roasted concentrate is known in the art as "calcine," and contains varying amounts of iron, a considerable proportion of which is converted to zinc ferrite in the roasting operation. This zinc ferrite is insoluble in spent electrolyte, and other comparably weak acid solutions which may be used for the purpose. Commonly, in the leaching of such a calcine with spent electrolyte or the like, there remains an insoluble residue which may constitute as much as 30 percent by weight of the calcine, and contain in the neighborhood of 18 to 28 percent zinc, and approximately 20 to 35 percent of iron, 60 to 78 percent of which may be in the form of zinc ferrite. Thus, as much as 20 percent of the zinc content of the calcine is tied up, as zinc ferrite, in the insoluble residue, but processing to recover the values therefrom has heretofore been considered too difficult to be economically feasible. Betts, in U.S. Pat. No. 1,066,245 recognized that previous practices left some zinc undissolved, caused "a voluminous slimy precipitate expensive to separate," as well as "a loss of zinc in the precipitate," and were otherwise objectionable, but "the best that can be done" with the improvement there disclosed was an "extraction of 90%." Later, in U.S. Pat. No. 1,259,594, Betts proposed to treat the undissolved residue with sulphuric acid under "reducing conditions (in distinction to oxidizing or neutral conditions)", and taught correctly, albeit contrary to Pagel Pat. No. 3,113,860, that such reducing conditions could be achieved by adding to the leach mixture "sulfurous acid—metallic iron, or iron sulfide—but other reducing agents also are capable of use" (p. 1, LL. 51, 58–60). Among the many reducing agents which are readily available and capable of converting "to the ferrous form any ferritic salt not already reduced" (ibid, p. 1, L. 76) without introducing solutes which may adversely affect the subsequent electrolytic deposition of zinc, metallic iron is the cheapest, but metallic zinc, magnesium, aluminum, and manganese, as well as their sulfides, are also usable.

According to Pagel Pat. No. 3,113,860, the zinc ferrite-laden-residue remaining from the leaching of zinc-ferrite-containing-calcine is releached with spent electrolyte in the presence of a reducing agent, such as metallic iron. The resulting releach liquor contains, as solutes, from about 90 to about 120 grams of zinc per liter, and up to as much as 60 grams of iron per liter, as well as other elements, such as antimony, arsenic, cadmium, cobalt, copper, and the like. But the separation of the solute from the slimy precipitate (ferrous iron) posed the same old problem. The slimy gelatinous mass defied filtration.

According to U.S. Pat. No. 2,772,230 to Hollander, when zinc-bearing material is leached with spent electrolyte, "iron which is unavoidably present in the material to be leached—is removed as ferric-hydroxide or basic ferric sulfate, or mixtures thereof, by precipitation under oxidizing conditions," and the "precipitated iron is then removed by filtration," but that the "precipitated iron is of a gelatinous nature and is filtered with great difficulty, requiring long and varying filtration periods" (col. 1). The latter is true in principle, but is, in degree, an understatement, at least as far as concerns the filtration of leach liquors derived from calcine containing substantial amounts of zinc ferrite, as to which the Hollander patent is silent. Even with leach liquor containing no more than "about ½–5 grams per liter" of iron, Hollander found it necessary to introduce "soluble phosphate and arsenate compounds" in order to filter out the precipitated (if such it can be termed) iron.

It is therefore an object of the present invention to provide a process whereby the zinc can be economically recovered from the residue remaining after the leaching, with spent electrolyte, of zinciferous material containing substantial amounts of zinc ferrite.

Another object of the present invention is to provide a process whereby iron is precipitated in particulate form from an iron-zinc leach liquor containing in excess of twenty grams per liter of iron.

Other objects will become apparent from reading the following disclosure which is in such clear, concise and exact terms as to enable those skilled in the art to readily practice the present invention.

The mixture containing dissolved, as well as undissolved, iron and zinc, resulting from the Pagel process hereinbefore mentioned, will be hereinafter referred to as the releach liquor. As stated previously, this releach liquor contains from 90 to 120 grams per liter of zinc, and up to about 60 grams per liter of iron, mostly in the ferrous (bivalent) form, as well as traces of other elements. In order to remove the iron from solution, the releach liquor is diluted by about 50 percent with water, and agitated with a basic material to neutralize it, while simultaneously introducing air into the suspension to oxidize the bivalent iron to trivalent iron oxide. This invention is predicated upon the discovery that the thus oxidized (bivalent) iron will be precipitated in a particulate form which is readily separable by filtration if the simultaneous neutralization and oxidation of the releach liquor be carried out by stages: in the first of which the pH value is maintained below 4 (e.g., 1.5 to 3.6); and in a succeding one of which the pH value is maintained at or above 4 (e.g., 4.5). The respective stages of neutralization and oxidation can be carried out in the same or different vessels, but not simultaneously in the same vessel because the first stage yields a filter cake rich in iron with little zinc whereas after filtration of the first stage slurry, the resulting filtrate contains substantially less iron than, but substantially the same quantity of zinc as, was contained in the releach liquor. On the other hand, the second stage may yield a precipitate which is rich in zinc, but low enough in iron to warrant its return to the first stage of neutralization and oxidation or its recycling as feed stock to the primary leach, whichever is most advantageous under the existing circumstances.

The following specific example will provide a representative exemplification of the present process.

EXAMPLE 1

A filtered releach liquor, containing 98.75 g./liter zinc, 30.50 g./liter $Fe^{+++}$, 27.00 g./liter $Fe^{++}$, 2.47 g./liter Cu, and 25 g./liter $H_2SO_4$, was diluted 50% with water and neutralized with zinc calcine slurry to a pH of about 3.3. Zinc calcine slurry was intermittently added to maintain the aforesaid pH. As the oxidation progresses, acid will be continuously regenerated due to the formation of the ferric oxide from the ferrous sulfate. The amount of zinc calcine slurry will vary stoichiometrically with the amount of acid formed.

The mixture was continuously agitated by means of a turbine and air was introduced into the bottom of the reaction chamberd through a sparge ring. The amount of air introduced, amounted to approximately 100% excess over the stoichiometric requirement. The temperature of the solution was maintained between about 65–70° C.

The solution recovered after the first run, about seven hours, contained Zn 137.50 g./liter; $Fe^{+++}$, 3.25 g./liter; $Fe^{++}$ 2 g./liter; and Cu, 1.95 g./liter. The dark red brown precipitate assayed: Zn 5.6% (water soluble zinc 1.3%), Fe 42.0% and Cu 2.3%.

This solution was retreated in a secondary oxidation step which was carried out in the same manner as the first oxidation step and required about six hours. The dark red brown precipitate from this secondary oxidation assayed: Zn 6.8% (water soluble Zn 1.7%), Fe 44.8% and Cu 1.98%; while the liquid phase contained no iron (either ferrous or ferric), Zn 140.0 g./liter and Cu 0.59 g./liter.

In practice, the precipitate from the secondary oxidation would be returned to the first stage for retreatment to recover some of the additional quantity of the total zinc oxide contained therein.

Under presently prevailing conditions, it is not economically feasible to recycle the precipitate from the first stage until a zinc content of zero is obtained. However, it is preferred, and economically feasible to reduce this zinc content down to less than 5%.

The oxidation phase of the process is carried out by introducing air into the solution. This can be accomplished in many ways, but the preferable manner is to cause the solution to be agitated while introducing the air at the point of agitation, or as used in the above example, through a sparge ring in the bottom of the reaction chamber. Thus, the introduction of air at the bottom of the chamber and near the mixer, to create simultaneous high speed agitation and thorough mixing of air and solution, has been found successful. Likewise, for effective operation of the process, the temperature of the solution should be between about 50° and about 70° C.

Certain metallic impurities, in addition to iron, will be removed from solution during the precipitation of the ferric oxide. Arsenic and antimony will be precipitated and will be present in the iron precipitate. Under certain conditions, when the pH is about 3.5 and the temperature at about 70° C., the copper will precipitate as cupric oxide. Also the filter cake will contain a small amount of zinc, about 5 percent total. Higher and lower concentrations of zinc have been obtained, but the zinc concentrations can be effectively, economically, and efficiently lowered to about 5 percent, while there is an economic problem existing where lower concentrations are strived for.

The process of the present invention can be run as either a batch-wise process or as a continuous process.

The typical pH range is between about 3.0 and 4.5; however, there are numerous advantages gained by maintaining the pH of the solution between about 3.1 and 3.6 in the first step or stage of oxidation. Due to the continuous formation of sulfuric acid during the process, that is by the conversion of ferrous sulfate to ferric oxide, there must be a continuous addition of the basic material. The preferred basic material is a zinc calcine slurry, since by its use, recoverable zinc is not only obtained from the filtered releach liquor, but also from the calcine added as a neutralizer. Other basic materials may also be employed as a neutralizer.

EXAMPLE 2

The accompanying drawing is a flow sheet showing, diagrammatically, one embodiment of a plant layout for continuous operation in accordance with the present invention.

As shown in the drawing, tank 1, provided with an agitator, is supplied by line 2 with spent electrolyte or other weak sulfuric acid solution from a source not shown. The "calcine" (roasted zinc ore concentrate) to be leached is charged into tank 1 by a screw conveyor 3 or other suitable means; and the leaching is carried out in accordance with the usual practice. When the leaching intended is complete, or has been carried to the desired extent, the contents of tank 1 are discharged through valve 4 to a thickener 5, where sedimentation occurs and the supernatent solution overflows through line 6 into a surge tank 7 while the settled slurry is delivered to a filter 8, which is preferably of the drum type. From filter 8, the filtrate also flows into the surge tank 7. The contents of tank 7 are delivered at will to a purification chamber 9. In the purification chamber, the solution from surge tank 7 is treated in any of a variety of ways known in the art to purify the filtrate. For example, the addition of zinc dust precipitates copper and cadmium from the solution. The discharge from purification chamber 9 is delivered to filter 10, which is preferably a filter press. From filter 10, the filtrate is delivered to appropriate storage for subsequent feed to the electrolytic cells.

The filter cake from filter 10 is, from time to time, washed out with water and discharged through line 11 for subsequent treatment to recover copper, cadmium, and other values precipitated in the purification chamber 9. Thus far, the arrangement described in this example is consistent with the practice in the art, prior to the Pagel process above mentioned.

In accordance with the Pagel process, the "residue" from the leach in tank 1 is releached in the presence of a reducing agent such as metallic iron. In the embodiment shown in the drawing, such "residue" is recovered as filter cake from drum filter 8, and delivered via a line 12 to a surge tank 13, along with such wash water as is necessary to pulp and move the filter cake from time to time. As and when desired, the slurry of "residue" in tank 13 is delivered to tank 14 which is equipped with an agitator, and arranged to receive spent electrolyte or other weak acid from line 2. In the tank 14, the "residue" is leached with spent electrolyte or other weak acid in the presence of metallic iron or other appropriate reducing agent.

Upon completion of the residue releach in tank 14, the leach liquor and suspended solids are delivered to a filter 15, preferably of the Burt type, from which the filtrate flows through valve 16. The filter cake from filter 15 is, from time to time, removed by washing with water and discharged through a line 17, and this discharge, along with that from line 11, may be treated to recover its content of metal values such as silver, gold and lead, and other minor metals.

From valve 16, the filtrate from filter 15 is delivered to a surge tank 18, and constitutes the feed stock for the present invention.

When and as desired, the solution in surge tank 18 is released to a mill 19, such as a ball mill or a pebble mill. Concurrently with the delivery to the mill 19 of the feed stock from tank 18, there is delivered thereto the requisite proportion of zinc oxide slurry. The zinc oxide slurry is made in tank 20 by mixing zinc oxide with water, and it is delivered through line 21 to the mill 19. The residence time within mill 19 of the solution from tank 18 and the zinc oxide slurry from tank 20, is practically nil, but the milling of the two components together, albeit practically instantaneously, is enough to prevent the particles of zinc oxide from agglomerating and becoming coated with zinc oxysulfate upon contact with the filtrate. Such agglomeration and coating, if permitted, substantially reduces the chemical effect of the zinc oxide in the reactions which take place when the milled mixture is discharged from mill 19 to tank 22, wherein oxidation, neutralization and precipitation concomitantly occur.

Tank 22 is equipped with an agitator and an air supply 23. During the initial filling of the tank 22 to the desired level with the milled mixture of solution from tank 18 and zinc oxide slurry from tank 20, and continuously thereafter, the reaction mixture is continuously aerated and agitated with simultaneous addition of zinc oxide slurry in an amount sufficient to maintain the pH value of the reaction mixture between 3.1 and 3.6 in this first stage of neutralization and oxidation. By periodic readings of the pH value of the reaction mixture within tank 22, or by automatic control of such pH value, it may readily be ascertained when the zinc oxide slurry should be increased or decreased to maintain the desired pH range. Process retention of from three to six hours at a temperature of 60° C. completes the first stage of the iron precipitation.

By "process retention" is meant the period of time which an average increment of the reaction mixture remains in the first stage tank 22. For example, if the first stage tank has an operating capacity of 10,000 gallons, and it is desired to operate with a process retention of six hours, the inflow of total feed components to, and outflow of reacted mixture from, the first stage tank should be at the rate of approximately 28 gallons per minute. "Process retention" depends upon the concentration of dissolved iron in the infeed; the greater the iron concentration, the longer the process retention. This may vary from ore to ore, or from hour to hour with the same ore. Therefore, for maximum efficiency, it is desirable to periodically sample and assay the reaction mixture, and to decrease the flow rates when the iron concentration has shown an increase. Preferably, however, the equipment is designed to maintain the process retention for the worst condition expected, i.e., the longer process retention, and even though, under less than the worst condition, the last hour or so of process retention may do no good, it does no harm. However, with the equipment so designed, there is no need to periodically sample and assay as long as the pH value is maintained within the aforesaid limits. Moreover, as a practical consideration, the process retention in the first stage tank 22 should be coordinated with the process retention in the second stage of precipitation later to be described. Although the great majority of iron is precipitated in the first stage, the subsequent second stage (where the initial iron concentration is much less) proceeds at a much slower rate, and it usually requires longer process retention to reduce the dissolved iron from 10 grams per liter to 0.1 gram per liter in the second stage, than to reduce it from 40 grams per liter to 10 grams per liter in the first stage.

In normal operation, the contents of tank 22 are continuously discharged through valve 24 into a thickener 25 from which the overflow is delivered via line 26 to second stage tank 30; and the thickener settlings are continuously delivered to filter 27, which is preferably of the drum type. The filtrate from filter 27 is continuously discharged through valve 28 and line 29 to line 26, and delivered along with the overflow from thickener 25 into second stage tank 30, which is equipped with a line 31 leading to zinc oxide slurry tank 20, as well as with an agitator 32 and an air inlet 33.

The filter cake from filter 27 is low in zinc and high in iron and, for the purpose of the present invention, may be regarded as discard.

Unless the content of dissolved iron has been reduced to the desired vadue in tank 22, further precipitation continues in second stage tank 30 with concomitant and continuouse introduction of air and zinc oxide slurry, the latter preferably being introduced in an amount sufficient to maintain the pH valve between 4 and 4.5. Here again, the rate of in-feed to, and outflow from, second stage tank 30 is maintained substantially equal, and so adjusted as to provide the process retention necessary to achieve the desired low content of dissolved iron. During this time, the contents of second stage tank 30 are discharged through valve 34 to thickener 35 from which the overflow is conducted by line 36 to surge tank 7.

While the settlings in thickener 35, under optimum conditions, may be substantially zinc free, if the zinc content thereof is sufficient to warrant it they may be returned via line 37 to mill 19 for re-processing in first stage tank 22 for recovery of any residual zinc.

In the drawing, an encircled W accompanied by parallel broken lines is intended to designate a selectively controllable source of water as for flushing filter cake out of the several filters, for making the zinc oxide slurry in tank 20, and, in the case of that designated 38, to supply first stage tank 22 with extra water for start-up.

The tanks 22 and 30 are each equipped with heating means such as a steam coil of capacity such as to maintain their contents at a temperature of about 60°–70° C.

In cases where the releach liquor fed to tank 22 contains substantial amounts of ferric iron, precaution should be exercised at "start-up" of the continuous operation to minimize the tendency of the iron to precipitate in a gelatinous, unfilterable state. One way to avoid the start-up difficulty is to dilute the releach liquor with an equal volume of water before introducing any neutralizing agent, such as zinc oxide slurry; and another way is to initially double the process retention and decrease the rates of input and output over that which is observed when the process gets going. A compromise between the aforesaid two ways of avoiding start-up difficulties is to introduce the neutralizing agent in a slurry of greater water content than when the process is operating continuously. In other words, the start-up technique for continuous operation is, in a sense, a single batch in which the iron is largely oxidized and precipitated before beginning the continuous introduction of releach liquor and slurry into tank 22, or the discharge of its contents to thickener 25.

A typical start-up batch for tank 22, having a capacity of 12,000 gallons, consists of:

(1) 5,000 gallons of releach liquor filtrate from filter 15 assaying:

| | Grams per liter |
|---|---|
| Zn | 100.0 |
| $Fe^{+++}$ | 10.0 |
| $Fe^{++}$ | 30.0 |
| Cu | 2.5 |
| $H_2SO_4$ | 25.0 |

Normally the filtrate is delivered to tank 22 at approximately leach tank temperature of about 60°–65° C.

(2) 5,000 gallons of water from source 38. Air is introduced into the batch at the rate of 30.5 cu. ft. per minute (room temperature, one atmosphere pressure) with concurrent introduction of 14.8 pounds (dry weight) per minute of zinc oxide (70% Zn, dry basis) in a slurry containing 50% (by weight) of zinc oxide, balance water. With the temperature maintained at about 60° C., and the pH value of the reaction maintained between 3.1 and 3.5, in about four hours, the iron has precipitated to the point that the assays are as follows:

| Solution (10,400 gallons) | Assay | Precipitate (1,248 lbs.) |
| --- | --- | --- |
| 74.50 grams per liter | Zn | 4.0 percent by weight. |
| 4.80 grams per liter | Fe | 44.0 percent by weight. |
| .84 grams per liter | Cu | 1.1 percent by weight. |

The system is now ready to begin the continuous discharge of the contents of tank 22, as well as the continuous introduction of new leach solution and zinc oxide slurry into tank 22, as a continuous operation. In normal continuous operation, no water is introduced at 38.

During continuous operation, the rate of discharge from tank 22 is substantially equal to the rate of input thereto. For example, for a tank 22 of 12,000 gallons' capacity, the filtrate (assay same as at start-up, above) from filter 15 may be admitted to tank 22 at the average rate of 27.8 gallons per minute; the slurry of 50% zinc oxide (70% Zn, dry basis) by weight, balance water admitted at the average rate of 19.6 pounds of zinc oxide per minute; and the air at the rate of 40.6 cu. ft. per minute. These last-mentioned average rates of admission for filtrate and slurry are calculated to yield a process rentention of about six hours, but the rates may fluctuate due to variations in the rate of iron precipitation, or variations in the in-feed filtrate which require variations in the in-feed zinc oxide slurry in order to maintain the desired pH value. Variations in such in-feed rates may be accomplished either manually or automatically to maintain a pH value of between 3.1 and 3.6 at all times (after start-up) in tank 22. Under the aforesaid conditions, and when the temperature of tank 22 is maintained at about 60° C., the discharge mixture from tank 22 typically assays:

| Solution | Assay | Iron cake, percent |
| --- | --- | --- |
| 144.0 grams per liter | Zn | 4.0 |
| 9.2 grams per liter | Fe | 44.0 |
| 1.6 grams per liter | Cu | 1.1 |

The "solution" of the preceding table is a combination of the overflow from thickener 25 with the filtrate from filter 27 and, in continuous operation of the system, it is fed through line 26 to tank 30 in the same volume and at the same rate which it emerges from the thickener 25 and the filter 27 combined. In the tank 30, such solution is mixed with zinc oxide slurry from tank 20, said slurry having the same composition as that specified in connection with the first stage of the iron precipitation at tank 22. In the second stage tank 30, however, the rate of addition of the zinc oxide slurry is much slower than in the first stage, and the rate of air introduction is also somewhat slower. For example, when the contents of tank 30 are maintained at a temperature of about 60° C., and the rate of introduction of solution through line 26 is approximately 27.8 gallons per minute, the zinc oxide slurry is introduced at the average rate of 4.4 pounds per minute, and the air is introduced into tank 20 at the rate of 18 cu. ft. per minute to maintain a pH value of the mix in tank 30 between 4.0 and 4.5. In the second stage tank 30, as in the first stage tank 22, the specific rate of introducing the zinc oxide slurry may fluctuate from hour to hour, or from day to day, but, in any event, the rate of introduction of the zinc oxide slurry should be such as to maintain a pH value of 4.0–4.5 of the mix in tank 30.

As in the case of first stage 22, during continuous operation, the mixture is discharged from second stage tank 30 at approximately the same rate as that at which the components collectively are introduced into tank 30, but in the case of tank 30, no special start-up technique is necessary, except to fill the tank with solution from tank 22 and oxide slurry before discharge commences. During the filling of tank 30, and after the level of the mixture thereof has reached the mouth of air inlet 33, agitation begins and the pH value is controlled as aforesaid, so that by the time tank 30 is filled to operating capacity, valve 34 may be opened for continuous discharge into thickener 35. After about six hours of such operation, the discharge through valve 34 will typically assay as follows:

| Solution | Assay | Solids, percent |
| --- | --- | --- |
| 154.0 grams per liter | Zn | 7.0 |
| 0.1 grams per liter | Fe | 41.6 |

The "solution" in the last-mentioned table is the overflow from thickener 35, and is conducted through line 36 to surge tank 7 for mixture and purification with the leach liquor which overflow from thickener 5. The settlings in thickener 35 have a sufficiently high content of zinc that they are worth recycling through the system, and accordingly such settlings, including not only the "solids" of the preceding table, but also a small amount of the solution, are therefore conducted through line 27 and intermixed in ball mill 19 with solution from surge tank 18 and zinc oxide slurry as part of the in-feed to first stage tank 22.

In both the first stage tank 22 and the second stage tank 30, the iron (and, to a lesser degree, other metals than zinc) is precipitated in particulate form as distinguished from a gelatinous condition. By "particulate form," as the expression is used herein, is meant that the precipitated material is in a form such as to be readily separatable from the liquid phase or fraction as by filtration or sedimentation.

It will be understood that where the filters employed are of a type which permits it, the "cake" is preferably removed continuously during the discharge of filtrate, but where the filters do not so permit, the flow of filtrate is periodically interrupted for a time sufficient to remove the "cake" as and when necessary.

In the first stage of the iron precipitation, it is important to introduce the zinc oxide slurry or other neutralizing agent, and to agitate continuously while either new solution is being introduced, or oxidation is taking place, or both. This is because the first function of the zinc oxide is to neutralize the acidity of the in-feed releach solution, and to bring the mixture to a pH of less than 4 but greater than 1.5; but, thereafter, as oxidation and precipitation of the iron occurs there is concomitant generation of sulphuric acid which must be immediately neutralized, else the precipitate is likely to be in gelatinous unfilterable condition. Hence, the rate of addition of neutralizer is reduced to maintain a pH of 4 to 4.5.

EXAMPLE 3

In situations where it is desired to minimize capital expenditure for the plant equipment, but at the sacrifice of some loss (e.g., 2%) in efficiency of zinc recovery, the system shown in the drawings may be modified by eliminating all elements except 1 through 10, and maintaining the leaching mixture in tank 1 at a temperature between 50° C. and just below the boiling point of the leaching mixture, for a period of about six hours, and thereafter, without removing the mixture from tank 1, releaching the unseparated residue by adding metallic iron, or other suitable reducing agent capable of converting the trivalent iron into bivalent iron without introducing solutes which may adversely affect the subsequent electrolytic deposition of zinc therein. When, by periodic sampling, it is determined that the trivalent iron in the leaching mixture has been reduced to less than about 5 grams per liter, the leaching mixture, while remaining in tank 1, is neutralized to a pH of between 1.5 and 3.6 as by adding calcine or other basic material. After the pH value has thus been adjusted the bivalent iron solute is oxidized by the introduction of air and the pH value maintained by adding more basic material. When, by periodic sampling, it is determined that most (e.g., 75%) of the ferrous (bivalent) iron has been converted to ferric (trivalent) oxide, two alternatives are available without removing the mixture from tank, to wit: (a) the air oxidation can be continued with a reduced rate of neutralizer addition until a pH value between 4.0 and 4.5 is achieved; or (b) the oxidation can be concluded without air introduction by the addition of enough manganese dioxide, calcine or lime, to raise the pH value to between 4 and 4.5, and complete the iron oxidation to the desired degree. In either event, the oxidation of bivalent iron and the precipitation of trivalent iron can be completed without moving the mixture out of tank 1, but when a batch is ready to be filtered, valve 4 is opened to admit the oxidized solution with entrained ferric precipitate to separating apparatus such as 5 and 8. Thereafter, the liquid phase is purified in 9, filtered at 10, and is then ready for use as electrolyte. As previously described, where it is economically advantageous to do so, the cake of solids from filter 10 can be further treated to recover the minor metal values therein. Since, in some cases, manganese is desirable in the electrolyte system, the filtrate or liquid phase of the releach liquor may be adjusted by the addition of manganese dioxide to achieve the desired manganese content of the electrolyte, as, for example, 4 grams per liter.

Many changes in and modifications of the present process may be made without departing from the spirit of the invention or sacrificing any of its advantages.

Having thus described the invention, what is claimed and desired to be secured by Letters Patent is:

1. In the art of making zinc electrolye from plant leach residue which has been releached under conditions such as to reduce a substantial amount of the trivalent iron therein to bivalent iron, the process of treating the trivalent-iron-depleted-releach liquor, which comprises:
   (a) neutralizing and oxidizing said releach liquor while maintaining the pH value thereof at a value substantially less than 4 until a substantial amount of the iron dissolved therein is precipitated in a form readily separable from the liquid phase thereof; and
electrodepositing zinc from the electrolyte.

2. The process of claim 1 wherein:
   (b) prior to the electrodepositing step at least the liquid phase of said releach liquor is subjected to a second neutralization and oxidation step while maintaining the pH value thereof between 4.0 to 4.5 until said liquid phase is further depleted of dissolved iron.

3. The process of claim 2 wherein said releach liquor is filtered and the separated solids treated to recover minor metal values therein.

4. The process of claim 1 wherein said pH value is between 1.5 and 3.6.

5. The process of claim 2 wherein all steps prior to the electrodepositing step are performed successively in the same vessel.

6. A continuous process for recovering zinc from zinciferous material comprising, successively:
   (1) leaching the zinciferous material to obtain a leach liquor and a residue;
   (2) leaching the residue with weak acid in the presence of a reducing agent to obtain a filtrate containing, as solutes,
      (a) more than 50 grams per liter of zinc, and
      (b) more than 20 grams per liter of iron;
   (3) precipitating iron from said filtrate by concomitantly:
      (a) agitating,
      (b) introducing air into,
      (c) neutralizing the acid regenerated in,
      (d) maintaining a pH value of about 3.1 to 3.6 in, said filtrate until iron dissolved therein has been precipitated in particulate form to an extent such that the solute iron is not more than about 5 grams per liter;
   (4) separating the particulate precipitate from the liquid fraction of said filtrate;
   (5) precipitating iron from said liquid fraction by concomitantly:
      (a) agitating,
      (b) introducing air into,
      (c) neutralizing the acid regenerated in,
      (d) maintaining a pH value of about 4 to 4.5 in, said liquid fraction until iron dissolved therein has been precipitated in particulate form to an extent such that the liquid phase is substantially iron-free;
   (6) separating the particulate precipitate from the substantially iron-free liquid phase to produce a crude zinc electrolyte; and
   (7) electrodepositing zinc from the electrolyte.

7. The process of claim 6 in which the neutralization (3c) and (5c) is accomplished by adding a water slurry of zinc oxide.

8. The process of claim 7 wherein the continuous operation of (3c) and (3d) is started by a batch operation in which said zinc oxide is added at a slower rate than during continuous operation.

9. The process of claim 7 in which said zinc oxide slurry is milled with said filtrate prior to (3b).

10. The process of claim 6 wherein the separated particulate precipitate from (6) is recycled into (3).

11. The process of claim 6 wherein the continuous operation of (3c) and (3d) is started by a batch operation in which said filtrate is diluted with substantially equal parts of water.

12. In a process for recovering zinc from a roasted zinc ore which comprises leaching said ore in a weak sulfuric acid until a solution and a resdue containing zinc ferrite are obtained, separating the solution and residue and releaching the residue with weak sulfuric acid in the presence of a reducing agent until zinc ferrite dissolves and a second solution is obtained containing zinc values and more than 20 grams per liter iron values, separating said second solution from any solids entrained therein, simultaneously agitating and aerating the said second solution while maintaining the pH at from about 3.1 to about 3.6 to precipitate iron values in particulate form, separating the precipitate from the liquid phase, simultaneously agitating and aerating the liquid phase while maintaining the pH at from about 4 to 4.5 to precipitate iron values in particulate form, separating the solid and liquid, and thereafter electrodepositing zinc from the liquid.

13. The process of claim 12 wherein the weak sulfuric acid solution in which the roasted zinc ore is leached is in substantial part spent electrolyte after electrolysis to remove zinc therefrom, and said solution has an acid concentration of at least as low as 50 grams per liter.

14. The process of claim 12 in which the first said weak sulfuric acid solution is in substantial part electrolyte from which zinc has been removed by electrodeposition.

15. In a process for recovering zinc from a roasted zinc ore which comprises leaching the ore in weak sulfuric acid until a solution and a residue containing zinc ferrite are obtained, separating the solution and residue and releaching the residue with weak sulfuric acid in the presence of a reducing agent, the improvement which comprises releaching said residue in the presence of a reducing agent until zinc ferrite dissolves and a second solution is obtained containing zinc values and more than 20 grams per liter iron values, separating said second solution from any solids suspended therein, mixing said second solution with zinc oxide slurry in a ball mill to adjust the pH to from about 3.1 to about 3.6 and simultaneously agitating and aerating the resulting solution to precipitate iron values in particulate form, separating the precipitate from the liquid phase and thereafter electrodepositing zinc from the liquid phase.

16. In a process for recovering zinc from a roasted zinc ore which comprises leaching the ore in weak sulfuric acid until a solution and a residue containing zinc ferrite are obtained, separating the solution and residue and re-leaching the residue with weak sulfuric acid in the presence of a reducing agent, the improvement which comprises releaching said residue in the presence of a reducing agent until zinc ferrite dissolves and a second solution is obtained containing zinc values and more than 20 grams per liter iron values, separating said second solution from any solids suspended therein, simultaneously agitating and aerating the said second solution while maintaining the pH at from about 3.1 to about 3.6 to precipitate iron values in particulate form, separating the precipitate from the liquid phase and thereafter electrodepositing zinc from the liquid phase.

References Cited
UNITED STATES PATENTS

| | | | |
|---|---|---|---|
| 2,117,205 | 5/1938 | Myhren | 23—125 |
| 1,259,594 | 3/1918 | Betts | 204—119 |

OTHER REFERENCES

A Text-Book of Qualitative Chemical Analysis by Vogel, 1947, pp. 182–183.

JOHN H. MACK, Primary Examiner

R. L. ANDREWS, Assistant Examiner

U.S. Cl. X.R.

23—200; 75—108, 120